United States Patent
Armstrong et al.

(10) Patent No.: US 7,248,397 B1
(45) Date of Patent: Jul. 24, 2007

(54) WAVELENGTH-DOUBLING OPTICAL PARAMETRIC OSCILLATOR

(75) Inventors: Darrell J. Armstrong, Albuquerque, NM (US); Arlee V. Smith, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 11/416,822

(22) Filed: May 3, 2006

(51) Int. Cl.
*G02F 1/35* (2006.01)
*H01S 3/10* (2006.01)

(52) U.S. Cl. .................. 359/330; 359/326; 372/22; 372/99

(58) Field of Classification Search ........... 359/326, 359/330; 372/21, 22, 99, 100, 92, 93
See application file for complete search history.

(56) References Cited

U.S. PATENT DOCUMENTS

| | | | |
|---|---|---|---|
| 5,291,503 A * | 3/1994 | Geiger et al. ............ | 372/21 |
| 6,647,033 B1 | 11/2003 | Smith et al. | |
| 6,647,034 B1 | 11/2003 | Smith et al. | |
| 6,775,054 B1 | 8/2004 | Smith et al. | |
| 2004/0021930 A1* | 2/2004 | Pfeiffer et al. .......... | 359/330 |

OTHER PUBLICATIONS

Gal Kalmani et al, "Polarization-mixing optical parametric oscillator", Optics Letters, vol. 30, No. 16, Aug. 15, 2005, pp. 2146-2148.
Arlee V. Smith et al, "Nanosecond optical parametric oscillator with a 90° image rotation: design and performance", Optical Society of America, Aug. 2002, vol. 19, No. 8, pp. 1801-1814.
J. C. Terry et al, "A Tandem POP Route to the Mid-IR," Optical Society of America, Advanced Solid State Lasers, vol. 19, 1998. pp. 236-239.

* cited by examiner

*Primary Examiner*—Hemang Sanghavi
(74) *Attorney, Agent, or Firm*—Carol I Ashby

(57) ABSTRACT

A wavelength-doubling optical parametric oscillator (OPO) comprising a type II nonlinear optical medium for generating a pair of degenerate waves at twice a pump wavelength and a plurality of mirrors for rotating the polarization of one wave by 90 degrees to produce a wavelength-doubled beam with an increased output energy by coupling both of the degenerate waves out of the OPO cavity through the same output coupler following polarization rotation of one of the degenerate waves.

12 Claims, 2 Drawing Sheets

WAVELENGTH-DOUBLING OPTICAL PARAMETRIC OSCILLATOR

The United States Government has rights in this invention pursuant to Department of Energy Contract No. DE-AC04-94AL85000 with Sandia Corporation.

BACKGROUND OF THE INVENTION

This invention relates to the production of wavelength-doubled light by a degenerate optical parametric oscillator (OPO).

Wavelength doubling is a potentially useful way to obtain light at a wavelength ($2\lambda$) twice as long as the wavelength ($1\lambda$) of a pump laser. For example, the Nd:YAG fundamental wavelength at $\lambda=1064$ nm can be doubled to $\lambda=2128$ using an OPO. If conversion efficiency from $\lambda$ to $2\lambda$ of 30%-50% could be obtained, wavelength-doubled Nd:YAG lasers might offer a well-developed, affordable alternative to costly 2-μm lasers such as Tm:YAG or Tm:Ho:YAG. A wavelength-doubled Nd:YAG laser could then serve as the "pump" source for crystal nonlinear optics (NLO) in materials that absorb wavelengths shorter than 2 μm. For example, an optical parametric oscillator (OPO) based on the mid-IR nonlinear crystal ZGP pumped by a wavelength-doubled Nd:YAG laser might allow affordable access to wavelengths in the important 4-8 μm spectral region. The cost of such an Nd:YAG-based system may be competitive with, or even cheaper than, systems pumped by Tm:YAG of Tm:Ho:YAG lasers having comparable performance specifications.

Kalmani et al. (G. Kalmani, A. Arie, P. Blau, S. Pearl, and A. V. Smith, "Polarization-mixing optical parametric oscillator," Optics Lett. 30 (2005) pp. 2146-2148) describes an optical parametric oscillator that uses polarization rotation in a linear retarder in combination with Type II degenerate parametric down-conversion in a periodically poled KTP ($KTiOPO_4$) crystal pumped by a 1064-nm pulsed Nd:YAG laser to produce a single, linearly polarized beam at precisely the degenerate wavelength of 2128 nm. This approach uses a planar cavity design with intra-cavity polarization and retardation optics.

A. V. Smith and D. J. Armstrong (U.S. Pat. No. 6,775,054) report a device for optical parametric amplification utilizing four mirrors oriented in a nonplanar configuration where the optical plane formed by two of the mirrors is orthogonal to the optical plane formed by the other two mirrors and with the ratio of lengths of the laser beam paths approximately constant regardless of the scale of the device. A conversion efficiency of greater than 45% is reported.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

Figure 1:
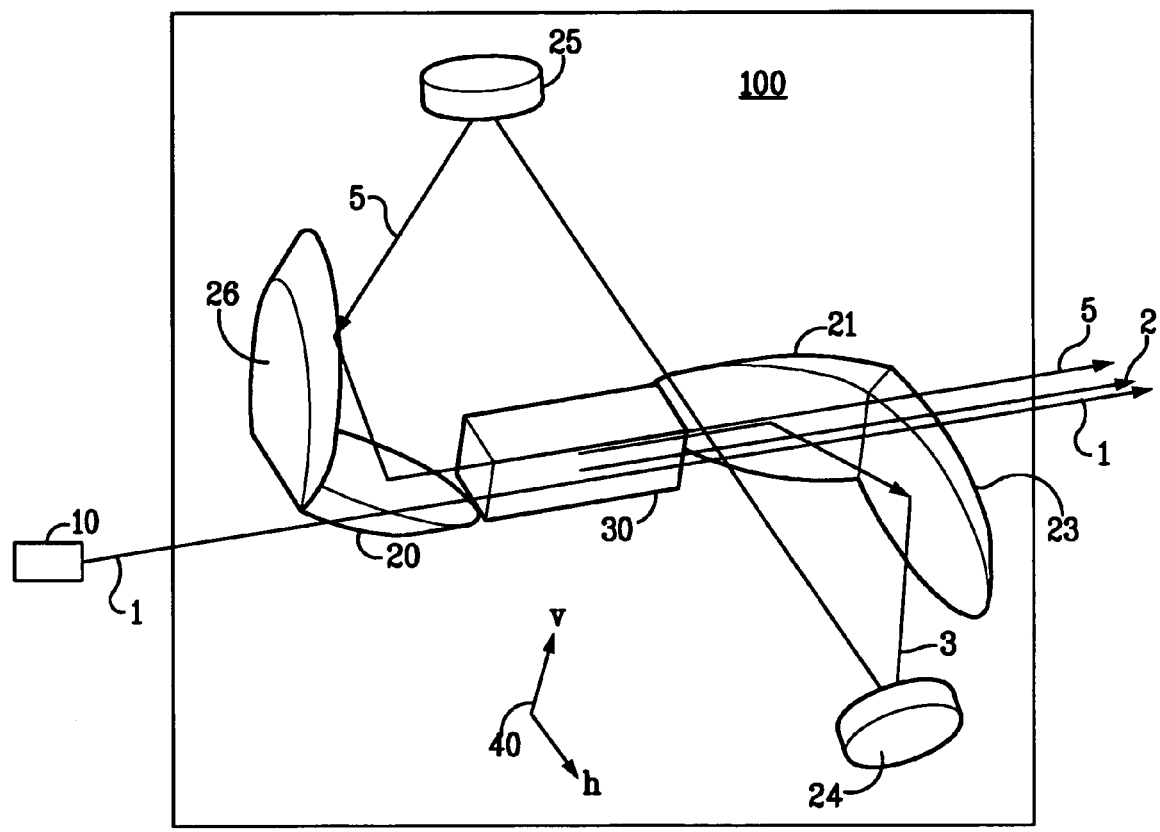
FIG. 1 illustrates an embodiment of a wavelength-doubling optical parametric oscillator (LDOPO).

Wavelength doubling is usually achieved using parametric down-conversion in a nanosecond OPO operating at "degeneracy," where the signal and idler wavelengths are each twice the wavelength of the pump. By convention, three-wave nonlinear mixing processes in crystals are described as type-I when signal and idler waves share the same ordinary or extraordinary linear polarization or type-II when the signal and idler waves have orthogonal linear polarization (one ordinary, one extraordinary). For type-I degenerate parametric down-conversion, the bandwidth of the generated light is extremely broad, and the signal and idler waves are indistinguishable. A type-I degenerate OPO is, therefore, multiply resonant, inherently unstable, and a poor choice for wavelength doubling. On the other hand, the bandwidth of light generated by type-II down-conversion is much narrower, and the signal and idler waves can be distinguished by their orthogonal polarization states. Type-II mixing enables stable OPO operation and can form the basis for a practical method for wavelength doubling using an OPO.

Type-II mixing can produce orthogonally polarized but equal-wavelength (degenerate) signal and idler waves. If one of these waves leaves the cavity, and the other wave circulates within the cavity and changes polarization state before it arrives at the crystal and mixes with the pump wave, oscillation will proceed as if the OPO possessed a singly-resonant cavity. For a degenerate OPO, this means the phase of the circulated wave will achieve stability with the phase of the pump, and will track the phase of the pump for any length of the cavity. The phase stability holds, even if multiple longitudinal modes circulate in the OPO cavity, as long as the polarization-selective reflection and rotation of polarization occurs equally for all modes. The OPO of Kalmani et al. obtained this condition using an intra-cavity linear retarder to rotate the polarization and an intra-cavity polarizer to reject one of the degenerate waves. Unfortunately, the experiments of Kalmani were carried out using a multi-longitudinal-mode pump laser, so evidence for phase-locking to the pump is not as strong as would be the case with a single-frequency pump. The work did suggest that a wavelength-doubling degenerate OPO whose circulating wave is locked in phase with the pump can be realized. However, the Kalmani design of the OPO cavity exhibits some significant shortcomings.

While attractive for wavelength doubling, type-II degenerate nanosecond OPO's based on conventional cavity designs have at least three inherent shortcomings. A serious problem inherent to all singly-resonant type-II degenerate OPO's using any cavity design, including conventional planar cavities and less conventional nonplanar cavities such as the RISTRA (Rotated Image Singly-resonant Twisted RectAngle) cavity, is output coupling effectively greater than 50%. In nanosecond OPO's, high output coupling results in late onset of oscillation and is followed by strong parametric back-conversion, which results in poor conversion efficiency. A second problem associated with conventional linear or planar cavity designs is the necessity of intra-cavity polarization and retardation elements such as polarizing beam splitter cubes or thin film polarizers and wave plates to reject one polarization and to rotate the polarization, which have the effect of reducing efficiency by increasing the number of spurious intra-cavity reflections and scattering. A third problem is multi-longitudinal mode oscillation, which limits the usefulness of degenerate OPO's as pump sources for longer-wavelength OPO's, such those based on the nonlinear crystal ZGP ($ZnGeP_2$). All of these problems are addressed by the wavelength-doubling optical parametric oscillator (LDOPO) of this present invention. We denominate a wavelength-doubling OPO using a cavity configuration that achieves approximately 90° polarization rotation and rejection of one orthogonally polarized degenerate wave without the use of additional intra-cavity polarization-rejecting optics or retardation optics as a "lambda-doubling OPO" (LDOPO).

In some embodiments, a modified RISTRA-type cavity can be used as the basis for the LDOPO. The unmodified RISTRA-type cavity contains two mirrors where one of the polarization directions lies in the plane of incidence at the surface of the first two mirrors (this is termed "in plane") and two mirrors where neither polarization direction lies in the plane of incidence at the surface of the second two mirrors (this is defined as "out of plane"). It also contains at least one waveplate when used as an OPO. The waveplate serves as an intra-cavity retardation optic. To maintain the approximately 90° polarization-rotating and image-rotating properties of this cavity, the orientations of the two out-of-plane mirrors are retained. Consequently, if one chooses to replace RISTRA-type cavity mirrors with an optical element, such as, for example, a pair of mirrors, to achieve a polarization-switching LDOPO, one would replace the in-plane mirrors and not the out-of-plane mirrors. Because the angle of incidence for the mirrors in some embodiments of the RISTRA-type cavity is approximately 32.80, replacing an in-plane mirror with a pair of mirrors, such that the propagation direction of the original cavity mode remains unchanged after reflecting from the replacement pair of mirrors results in an angle of incidence for each mirror in the pair of approximately 61.4°. This is a useful configuration because 61.4° is sufficiently close to Brewster's angle (for most common mirror substrate materials) that dielectric coatings having a high degree of (S-polarization)-versus-(P-polarization) discrimination can be easily fabricated. This polarization discrimination enables the rejection of one of the two orthogonally polarized signal or idler waves from the cavity. The fabrication of mirror coatings with optical damage thresholds that are sufficiently high for typical intra-cavity fluences ($J/cm^2$) or irradiances ($W/cm^2$) that are found in nanosecond OPO's is well established in the art. As the angle of incidence increases or decreases relative to Brewster's angle, it is less likely that dielectric coatings will have the desired (S-polarization)-versus-(P-polarization) discrimination, or that they will possess adequately high optical damage thresholds. The characteristics of the optical coatings that are suitable for application in embodiments of this invention are good S-versus-P polarization discrimination and high resistance to optical damage. The specific angles that may be used for this invention are dependent on the characteristics of the mirror coatings that are available for a given optical substrate material and upon the state of the art in optical thin film technology. For most of the embodiments described herein, the description will be directed toward configurations appropriate for currently available dielectric coatings; advances in coating technology will enable additional embodiments of this invention.

Some embodiments of this invention achieve a rotation of the intra-cavity polarization by approximately 90° without the use of intra-cavity retardation optics. For one embodiment, a non-planer cavity is used. It is similar in some respects to the RISTRA-type cavity mirror configuration wherein the two in-plane mirrors of the RISTRA-type cavity are replaced by mirror pairs. The cavity of this embodiment is an image-rotating cavity; this is achieved by the use of an even number of cavity mirrors. The cavity does not rely on a waveplate for polarization alteration.

For operation of some embodiments of the LDOPO of this invention, one physical consideration is rotation of the intra-cavity polarization by approximately 90° without the use of intra-cavity retardation optics. Such a cavity will be non-planar, and it will also be an image-rotating cavity. This is achieved using an even number of cavity mirrors. Suitable mirror designs for OPO's are constrained by the available fabrication techniques for thin-film dielectric coatings. For a cavity that rejects one orthogonally polarized wave using the reflective properties of the mirrors rather than additional intra-cavity polarization-modifying optical elements, the ratio of S- to P-reflectivity must be sufficiently high that the efficiency of the OPO does not diminish below a useful level. A goal in the design of the cavity is to make the reflection of the S-polarized light to be as close to 100% as can be achieved and the reflection of the P-polarized light to be as close to 0% as can be achieved. Note that all losses in the power of a circulated wave due to cavity design result in what appears to be an increase in output coupling. While each potential cavity design and its associated mirror coatings will involve a unique set of physical parameters for optimum performance, it is generally true that as the angle of incidence moves away from Brewster's angle, the high (S-polarization)-versus-(P-polarization) discrimination will be difficult to maintain. For example, in the design for a near-Brewster-mirrored LDOPO (as illustrated in FIG. 1), the cavity will circulate the S-polarized wave with high efficiency, and reject the P-polarized wave with high efficiency. If possible, it is desirable to have an S-reflection of the order of 99%. For angles of incidence that differ more from Brewster's angle, this polarization-discriminating efficiency may diminish; this can lead to the output coupling of the cavity becoming much greater than 50%. The actual value will depend on many factors, including the number and reflectivity of the cavity mirrors. At some value of output coupling greater than 50%, the efficiency of the OPO (generally defined in terms of increased oscillation threshold and reduced output energy) will become impractical as a 2% light source with respect to available pump laser resources and optical damage thresholds of dielectric coatings and of the nonlinear crystal. Any reduction below 100% in the reflection of the S-polarized light at the output coupler mirror leads to an increase in the required pump power to achieve oscillation threshold. The embodiments described in detail herein are based on a modification of the RISTRA cavity concept; other image-and-polarization-rotating cavities with an even number of mirrors that in combination perform approximately 90° rotations are also suitable for modification in accordance with the concepts embodied in this invention to produce LDOPOs. It is intended that such alternative cavity designs be included in the scope of this invention.

In some embodiments, intra-cavity polarization elements and the additional losses due to reflections and scattering that they cause can be eliminated using a modification of the non-planar-ring image-rotating OPO cavity known as RISTRA (rotated image singly resonant twisted rectangle). RISTRA is described in Smith and Armstrong U.S. Pat. No. 6,775,054, which is incorporated herein by reference. The RISTRA cavity is a four-mirror ring that produces 90° of image rotation and 90° of polarization rotation for each round-trip through the cavity. When used as an optical parametric oscillator, it includes at least one waveplate that serves as an intra-cavity retardation optic. Due to its non-planar configuration, where the resonant wave propagates in two orthogonal planes connected by a common optical path, the RISTRA cavity geometry is suitable as a starting point for use in a type-II degenerate OPO. The geometry of the RISTRA-type cavity by itself accomplishes the required polarization rotation. Polarization rejection can be obtained by replacing the two in-plane mirrors with mirror pairs designed to efficiently reject one of the orthogonally polarized signal or idler waves from the cavity. The modes of non-planar cavities like RISTRA are largely insensitive to small tilts of their cavity mirrors. Relative insensitivity to tilt makes such cavities amenable to the incorporation of unconventional mirror designs for efficient polarization rejection since the cavity design is not constrained by the necessity of maintaining near-perfect cavity-mirror alignment. In some embodiments, specially designed polarization-selective dielectric coatings at the RISTRA cavity's standard angle of incidence near 32.7° may provide adequate polarization selection. Using current optical thin film technology, coatings that would have adequate polarization selection would require many layers and would be likely to have lower optical damage thresholds. Advances in thin-film technology may expand the range of coatings and angles of use in embodiments of this invention. In other embodiments, angles of incidence near Brewster's angle, for example, between about 55° and 65° for a substrate material having an index of refraction near 1.5, may be used. Two near-Brewster-angle mirrors can be used in place of a single mirror; the inherent alignment insensitivity of the non-planar RISTRA-type cavity can easily accommodate this modification in some embodiments.

The operation of one embodiment that is based on a modified RISTRA-type design is described below with reference to FIG. 1. In the original RISTRA cavity, a waveplate is incorporated as a retarder to adjust the polarization. This waveplate is not needed for the LDOPO cavity of this embodiment of this invention. The directions described as horizontal and vertical are indicated by the axes 40. A single-frequency pump laser 10 generates vertically polarized light 1 with wavelength 1λ that is injected into the cavity through a mirror 20. Alternative placements of the NLO crystal between other mirrors, for example, between mirrors 23 and 24 or between mirrors 25 and 26, can be used; light would than be coupled in and out of the cavity through one of the mirrors approximately in line with the crystal. The pump light 1 generates a degenerate pair of waves 2 and 3 in the type II nonlinear optical (NLO) element 30. The signal wave 2 is defined for the purpose of this embodiment as the wave having horizontal polarization at the output coupler mirror 21. It exits the cavity 100 through the mirror 21. This exiting wave has P-type polarization with respect to the near-Brewster mirror. The second or idler wave 3 is defined as the wave having vertical polarization at the output coupler mirror 21. The second wave 3 traces a path through the cavity by reflection from mirrors 21, 23, 24, 25, 26, and 20. By reflection from mirrors 24 and 25, the polarization of the second wave is switched from vertical 3 to horizontal 5. The horizontally polarized second wave 5 is reflected from mirrors 26 and 20 to pass through the NLO element 30 and exit the cavity through mirror 21. The mirrors 21, 23, 26, and 20 are positioned so that the second wave (3 and 5) has an angle of incidence at each mirror that is near Brewster's angle. For a mirror comprising material that produces a Brewster's angle of about 57°, angles of incidence between about 51° and 61° may be used. We note that the range of angles suggested here, from 51°-61°, is not a specific constraint on a particular design, as the angle used depends on cavity geometry, the index of refraction of the substrate material, and the reflection characteristics of the optical coatings applied to the substrates. An angle of incidence is sufficiently "near" Brewster's angle when the P-polarized wave is reflected by less than 1% from an uncoated optical substrate of a given material. The dielectric coatings applied to the near-Brewster-angled substrate enhance S-reflection and further reduce P-reflections.

A planar cavity can be modified to become a polarization switching type-II degenerate OPO. Such cavities will use polarization rotation optics and waveplates. For nonplanar cavity designs that do not require additional intra-cavity optics for polarization rotation and rejection of one polarization, an even number of mirrors is required. The preceding discussion presents for simplicity an embodiment using 6 cavity mirrors; inclusion in the cavity of a larger numbers of mirrors is also possible in alternative embodiments of this invention.

For stable type-II degenerate oscillation with polarization rotation and selection, output coupling greater than about 50% is unavoidable, but the effects of such high output coupling can be mitigated by pulse injection seeding the OPO. This is done by injecting enough light into the OPO cavity at 2λ so that oscillation begins at approximately the same time that the pump pulse arrives; this enables conversion of more of the 1λ pump light to 2λ light. With proper cavity design, pulse injection seeding is an effective way to reduce parametric back-conversion as well. While injection seeding normally requires frequency-stabilized continuous-wave (cw) seed lasers and active frequency stabilization of the OPO cavity, pulse seeding of type-II degenerate OPO's is possible using no active frequency stabilization.

In some embodiments, a secondary, low-energy, degenerate OPO, generally pumped by the same laser as the primary LDOPO, can be used to provide the seed pulse. Multiple pump lasers can be used if they have the same frequency. For some embodiments, a representative seeder LDOPO is illustrated in FIG. 2.

Figure 2:
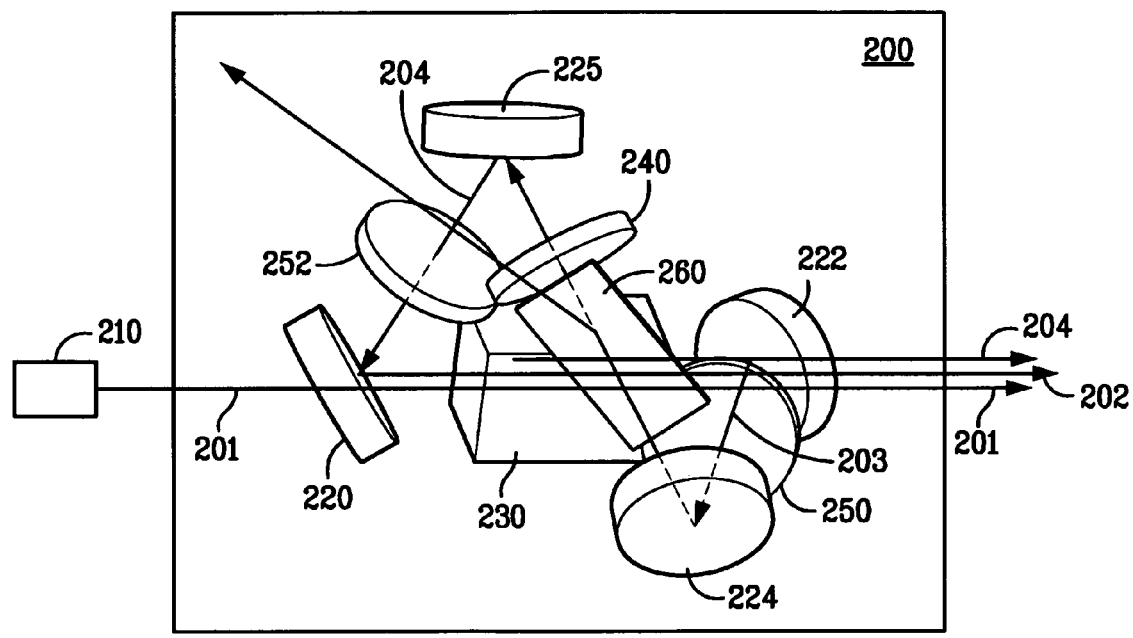
FIG. 2 illustrates an embodiment of an optical parametric oscillator containing an etalon that can serve as a source of light for injection seeding an LDOPO.

The OPO of FIG. 2 is an embodiment of a single-frequency seeder LDOPO. The seeder LDOPO 200 uses a single-mode pump laser 210 and a low-finesse etalon 240 placed in the cavity of the seeder LDOPO to provide a single-frequency seed pulse for the primary LDOPO of FIG. 1. Light 201 with wavelength 1λ from a single-frequency pump laser 210 enters the seeder LDOPO cavity 200 through an input coupler mirror 220. The 1λ-light generates signal 202 and idler 203 waves at a wavelength of 2λ within the type II nonlinear optic element 230. The output coupler does not discriminate well between S-polarization and P-polarization as it has S-reflection of about 60% and P-reflection of about 40%; this is a result of an angle of incidence near 32.8°. Consequently, both S- and P-waves are reflected from the output coupler mirror 222. The first waveplate 250, located between mirrors 222 and 224, is oriented to rotate both the S- and P-polarized 2λ waves so they will have in-plane reflections from mirror 224. After reflecting from mirror 224, they remain linearly polarized, but the distinction of which is the signal 202, and which the idler 203, is unimportant. One of these waves is rejected from the cavity by a polarizer 260, and the other continues around the cavity. Following passage through the intra-cavity etalon 240 (whose function is described below) and after reflecting from mirror 225, the polarization of the remaining single-frequency wavelength-doubled wave is rotated by the second waveplate 252 so that, after reflecting from the input coupler 220, it has the opposite polarization—either ordinary or extraordinary—of what it had when it left the crystal. It is unimportant whether the wave is originally the signal 202 or the idler 203 as long as its polarization state has been switched by 90° of polarization rotation after one round trip of the cavity.

After the remaining wave passes through the polarizer 260, it enters the etalon 240. The design and tuning of an etalon is well known to those skilled in the art. For example, the etalon can be solid or air-gapped. The etalon is angle- or temperature-tuned if solid. If air-gapped, its gap-spacing can be adjusted by mounting one of the etalon mirrors on a piezo-electric transducer. It is tuned to select a single longitudinal mode of the seeder LDOPO cavity 200 at degeneracy to provide single-frequency oscillation at degeneracy. The single-frequency 2λ light from the seeder LDOPO is input to the primary LDOPO to provide injection seeding. Injection can be done at any place in the cavity.

The etalon 240 selects single-longitudinal-mode oscillation at degeneracy. In some embodiments, the etalon is selected to have a high enough finesse for single frequency oscillation but not so high that it greatly reduces the OPO efficiency. The seeder LDOPO injection-seeds the primary LDOPO (one embodiment of which is illustrated in FIG. 1) with a single-frequency pulse. This causes both oscillators to track the phase of the pump light from the pump laser and to oscillate exactly at degeneracy. Consequently, for the unique circumstances afforded by type-II degenerate OPO's, pulsed injection seeding using an intra-cavity etalon addresses two problems simultaneously. Conversion efficiency can be increased, and oscillation will occur on a single longitudinal mode.

The preceding discussion has been largely directed toward embodiments involving single-frequency operation of an LDOPO. However, embodiments where the LDOPO is operated as a multimode optical device are within the scope of this invention. In some embodiments, multi-mode pump light rather than single-frequency pump light is introduced into the LDOPO cavity to produce multimode emission from the LDOPO. Other embodiments involving multimode, pulsed seeded operation can be obtained by removing the intra-cavity etalon from the seeder LDOPO. The seeder LDOPO and the primary LDOPO can be pumped using a pump source operating single frequency or on multiple longitudinal modes. The characteristics of the operation of the wavelength-doubling system described previously remain the same; the wavelength doubled light will be multimode due to the multimode characteristic of the pump or seed beam.

The foregoing description of the invention has been presented for purposes of illustration and description and is not intended to be exhaustive or to limit the invention to the precise form disclosed, and obviously many modifications and variations are possible in light of the above teaching. The embodiments are chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A wavelength-doubling optical parametric oscillator device, comprising:
   a nonlinear optical medium oriented on an optical path in an optical cavity, a first wave and a second wave being generated within the nonlinear optical medium by a pump beam, the first wave and the second wave each having a wavelength of two times a pump beam wavelength;
   a first mirror pair comprising an output coupler mirror and a second mirror, the output coupler mirror being an output coupler for the first wave and being positioned to receive the second wave at near Brewster's angle and to reflect the second wave to the second mirror, the second mirror being positioned to reflect the second wave at near Brewster's angle and to reflect the second wave to a third mirror,
   the third mirror positioned to reflect the second wave to a fourth mirror;
   the fourth mirror positioned to reflect the second wave to a fifth mirror, wherein a rotation of a polarization of the second wave through 90 degrees is caused by a combined reflection from the third mirror and the fourth mirror; and
   a second mirror pair comprising the fifth mirror and an input coupler mirror, the fifth mirror being positioned to receive the second wave at near Brewster's angle and to reflect the second wave to the input coupler mirror and the input coupler mirror being positioned to reflect the second wave at near Brewster's angle to the output coupler mirror,
   wherein an intra-cavity retardation optic is not a component of the optical cavity.

2. The wavelength-doubling optical parametric oscillator device of claim 1, wherein a first portion of the optical path comprising reflection from the input coupler mirror, the output coupler mirror, the second mirror and the third mirror lies in a first plane and wherein a second portion of the optical path comprising reflection from the fourth mirror, the fifth mirror, the input coupler mirror, and the output coupler mirror lies in a second plane that is orthogonal to the first plane.

3. The wavelength-doubling optical parametric oscillator device of claim 1, wherein the nonlinear optical medium is positioned between the input coupler mirror and the output coupler mirror.

4. The wavelength-doubling optical parametric oscillator device of claim 1, further comprising:
   a seeder optical parametric oscillator for providing an injection seeding pulse.

5. The wavelength-doubling optical parametric oscillator device of claim 1, further comprising:
   a seeder optical parametric oscillator for providing an injection seeding pulse, the seeder optical parametric oscillator comprising an intra-cavity etalon.

6. The wavelength-doubling optical parametric oscillator device of claim 1, wherein the pump beam is provided by a laser wherein the laser is a nanosecond pulsed laser, a q-switched solid state laser, a optical parametric oscillator, or a wavelength-doubled optical parametric oscillator.

7. A wavelength-doubling optical parametric oscillator device, comprising:
   a nonlinear optical medium oriented on an optical path in an optical cavity, a first wave and a second wave being generated within the nonlinear optical medium by a pump beam, the first wave and the second wave each having a wavelength of two times a pump beam wavelength;
   a first mirror pair comprising an output coupler mirror and a second mirror, the output coupler mirror being an output coupler for a first wave and being positioned to receive a second wave at near Brewster's angle and to reflect the second wave to the second mirror and the second mirror being positioned to reflect the second wave at near Brewster's angle and to reflect the second wave to a third mirror;
   an even number of mirrors comprising the third mirror positioned to reflect the second wave, the even number of mirrors producing a rotation of a polarization of the second wave through 90 degrees before reflecting from a fourth mirror;
   a second mirror pair comprising a fourth mirror and an input coupler mirror, the fourth mirror being positioned to receive the second wave at near Brewster's angle and to reflect the second wave to the input coupler mirror and the input coupler mirror being positioned to reflect the second wave at near Brewster's angle to the output coupler mirror, wherein an intra-cavity retardation optic is not a component of the optical cavity.

8. The wavelength-doubling optical parametric oscillator device of claim 7, wherein a first portion of the optical path comprising reflection from the input coupler mirror, the output coupler mirror, the second mirror and the third mirror lies in a first plane and wherein a second portion of the optical path comprising reflection from the fourth mirror, the input coupler mirror, and the output coupler mirror lies in a second plane that is orthogonal to the first plane.

9. The wavelength-doubling optical parametric oscillator device of claim 7, wherein the nonlinear optical medium is positioned between the input coupler mirror and the output coupler mirror.

10. The wavelength-doubling optical parametric oscillator device of claim 7, further comprising:

a seeder optical parametric oscillator for providing an injection seeding pulse.

11. The wavelength-doubling optical parametric oscillator device of claim 7, further comprising:

a seeder optical parametric oscillator for providing an injection seeding pulse, the seeder optical parametric oscillator comprising an intra-cavity etalon.

12. The wavelength-doubling optical parametric oscillator device of claim 7, wherein the pump beam is provided by a laser wherein the laser is a nanosecond pulsed laser, a q-switched solid state laser, a optical parametric oscillator, or a wavelength-doubled optical parametric oscillator.

* * * * *